United States Patent [19]

Rockwood

[11] 4,088,553

[45] May 9, 1978

[54] METHOD FOR SEPARATING BORON ISOTOPES

[75] Inventor: Stephen D. Rockwood, Los Alamos, N. Mex.

[73] Assignee: The United States of America as represented by the United States Department of Energy, Washington, D.C.

[21] Appl. No.: 478,560

[22] Filed: Jun. 12, 1974

[51] Int. Cl.² ............................ B01J 1/10; B01K 1/00
[52] U.S. Cl. .................... 204/157.1 R; 204/DIG. 11; 250/527
[58] Field of Search .................. 204/157.1 R, DIG.11

[56] References Cited

U.S. PATENT DOCUMENTS

| 3,443,087 | 5/1969 | Robieux et al. | 204/157.1 R |
| 3,937,956 | 2/1976 | Lyon | 204/DIG. 11 |
| 3,951,768 | 4/1976 | Gurs | 204/DIG. 11 |

FOREIGN PATENT DOCUMENTS

| 690,681 | 7/1964 | Canada | 204/157.1 R |
| 1,959,767 | 6/1971 | Germany | 204/DIG. 11 |

OTHER PUBLICATIONS

Ambartzumian et al., Applied Optics, vol. 11, No. 2, (Feb., 1972), pp. 354–358.

Karlov, Applied Optics, vol. 13, No. 2 (Feb., 1974), pp. 301–309.

*Primary Examiner*—Howard S. Williams
*Attorney, Agent, or Firm*—Dean E. Carlson; Edward C. Walterscheid

[57] ABSTRACT

A method of separating boron isotopes $^{10}B$ and $^{11}B$ by laser-induced selective excitation and photodissociation of $BCl_3$ molecules containing a particular boron isotope. The photodissociation products react with an appropriate chemical scavenger and the reaction products may readily be separated from undissociated $BCl_3$, thus effecting the desired separation of the boron isotopes.

9 Claims, 6 Drawing Figures

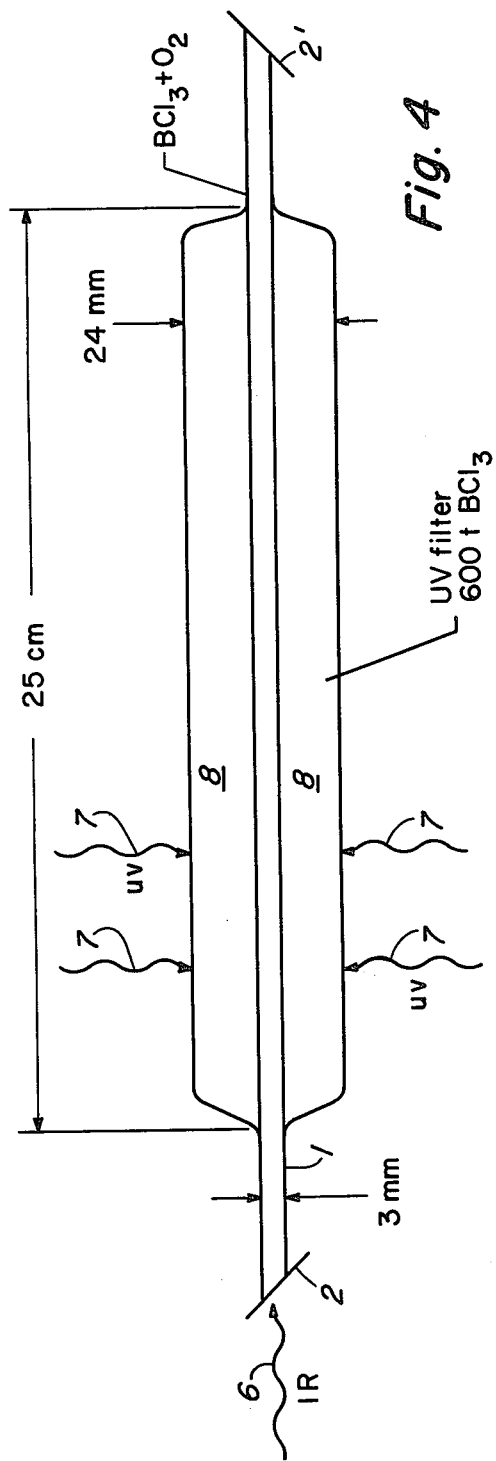
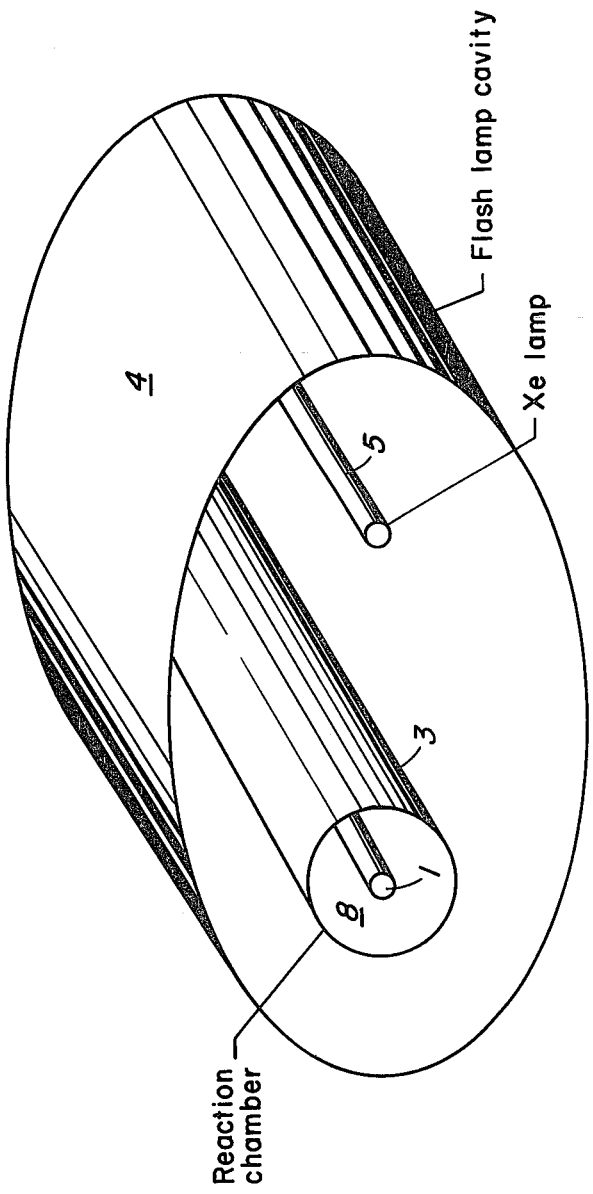

METHOD FOR SEPARATING BORON ISOTOPES

BACKGROUND OF THE INVENTION

The invention described herein was made in the course of, or under, a contract with the U. S. ATOMIC ENERGY COMMISSION.

It relates to a method for separating boron isotopes and more particularly to a method based on laser-induced selective excitation and photodissociation of $BCl_3$ molecules containing a particular boron isotope.

Boron highly enriched in $^{10}B$ has substantial utility as a neutronic poison in nuclear reactors. The art discloses two methods for separation of $^{10}B$ and $^{11}B$. The first consists of the fractional distillation of the dimethyl- or diethyl-ether complex of $BF_3$. The second involves the low temperature fractional distillation of $BF_3$ itself. Heretofore there has been no known technique for separating these isotopes by selective excitation and photodissociation of a boron-containing compound.

SUMMARY OF THE INVENTION

The isotopes $^{11}B$ and $^{10}B$ may readily be separated by irradiating gaseous $BCl_3$ containing both isotopes, selectively exciting those $BCl_3$ molecules containing the desired B isotope, photodissociating the excited $BCl_3$, reacting the photodissociation products with an appropriate chemical scavenger, and separating the undissociated $BCl_3$ from the reaction products.

The necessary selective excitation is accomplished by irradiating a gaseous mixture of the $BCl_3$ and the scavenger with light from the P or R branch of a $CO_2$ laser. Simultaneous irradiation of the mixture with ultraviolet light at 213 to 215 nm then results in photodissociation of selectively excited $BCl_3$ and prompts a reaction of the photodissociation products with the scavenger.

Preferably the $CO_2$ laser radiation is from the P branch which selectively or at least preferentially excites those $BCl_3$ molecules containing $^{11}B$. The chemical scavenger may be any material that is gaseous, does not substantially absorb either the infrared or the ultraviolet radiation, and is reactive with the photodissociation products of $BCl_3$ but substantially non-reactive with $BCl_3$ itself. Oxygen and various alkenes are suitable for this purpose. The requisite ultraviolet radiation is readily obtained from the output of Xe or $D_2$ flashlamps filtered through unexcited $BCl_3$.

BRIEF DESCRIPTION OF THE DRAWINGS

FIG. 4 shows a reaction vessel and ultraviolet filter used in an actual reduction to practice of the invention.

FIG. 5 shows the placement of the ultraviolet source and the reaction vessel within the flashlamp cavity.

DESCRIPTION OF THE PREFERRED EMBODIMENT

Figure 1:
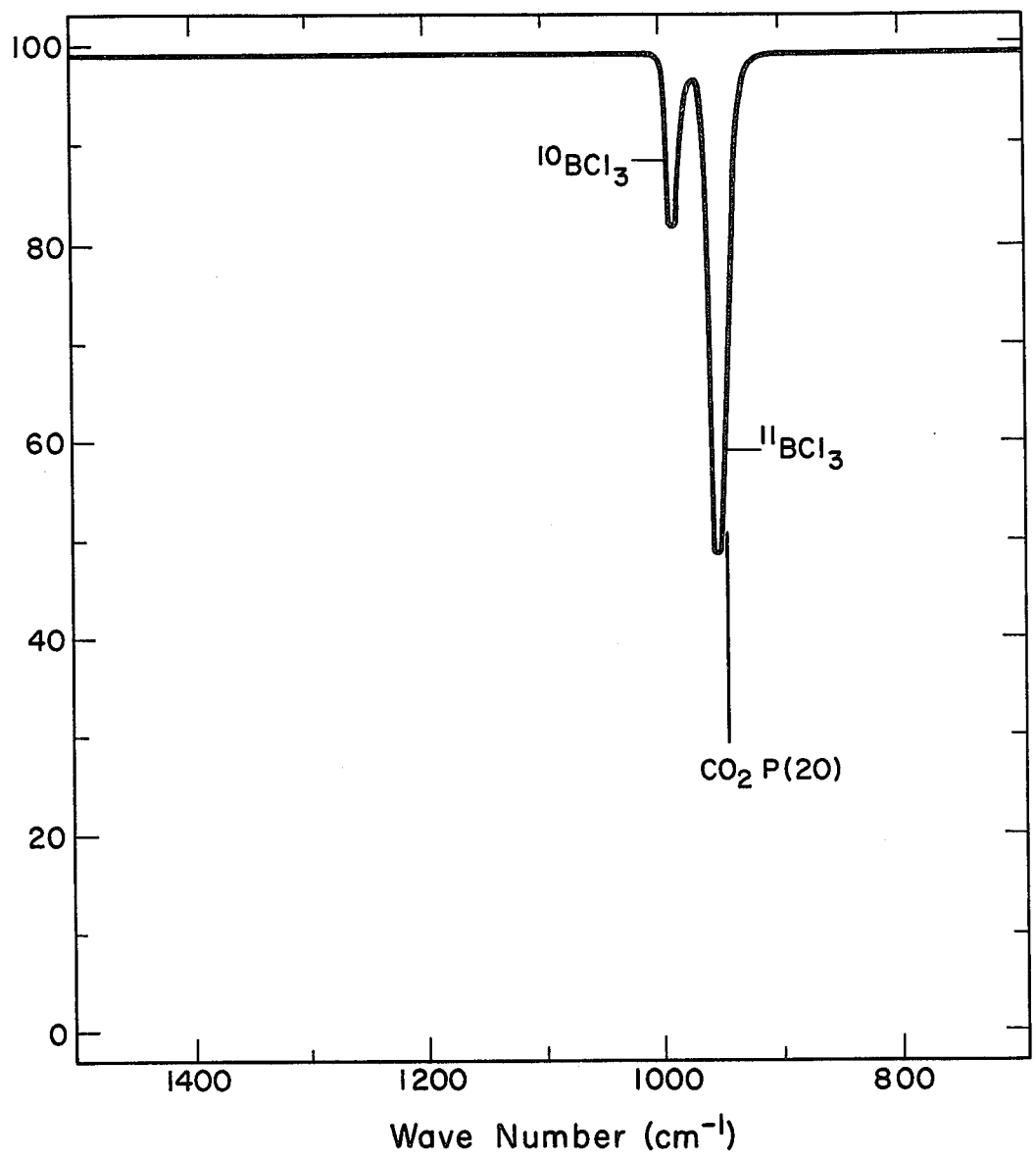
FIG. 1 is the infrared absorption spectrum of $BCl_3$ containing a natural abundance of boron isotopes.

The isotopic abundance of natural boron is 19.8 at % $^{10}B$ with the remainder being $^{11}B$. The compound $BCl_3$ has a boiling point at 1 atm of 12.5° C and absorbs the radiation of a $CO_2$ laser. This absorption takes place in the $\nu_3$ mode which for $^{10}BCl_3$ has a frequency $\nu_3 = 995$ cm$^{-1}$ and for $^{11}BCl_3$ a frequency $\nu_3 = 956$ cm$^{-1}$. The infrared absorption spectrum of $BCl_3$ at 0.5 torr and containing a natural ratio of boron isotopes is shown in FIG. 1. The isotope shift of 39 cm$^{-1}$ is a very large one and is located within the manifold of rotational lines available from the $CO_2$ laser. The $CO_2$ P branch lines largely coincide with the $^{11}BCl_3$ absorption peak, whereas the R branch lines are matched to a large degree by the $^{10}BCl_3$ absorption peak. As shown in FIG. 1, the $CO_2$ P(20) line which is one of the strongest P branch lines is well within the $^{11}BCl_3$ absorption peak.

Boron trichloride dissociates in the vicinity of $3.8 \times 10^4$ cm$^{-1}$. The products of dissociation are not accurately known but are quite probably the free radicals Cl and $BCl_2$. As free radicals, both are highly reactive and readily consumed by an appropriate chemical scavenger. In accordance with the preferred embodiment, $BCl_3$ molecules containing a particular boron isotope are excited with the appropriate line of a $CO_2$ laser, the excited molecules are preferentially dissociated by ultraviolet radiation, and the dissociation products containing the particular isotope react with a chemical scavenger.

Figure 2:
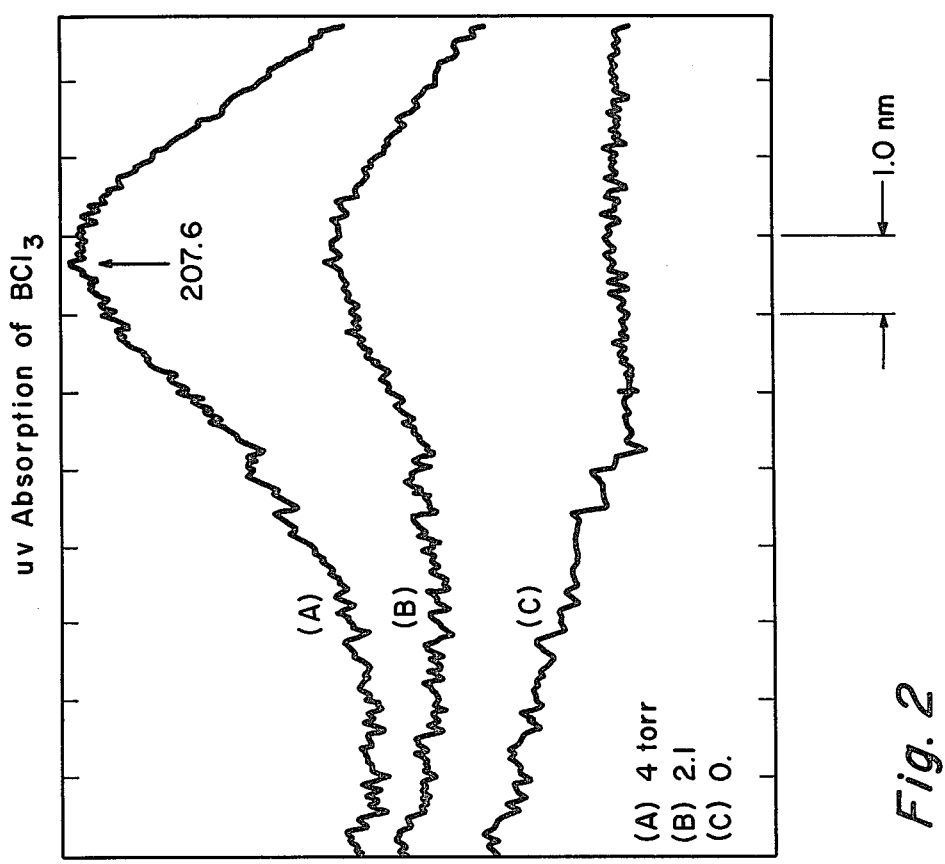
FIG. 2 displays ultraviolet absorption spectra of $BCl_3$ containing a natural abundance of boron isotopes.
Figure 3:
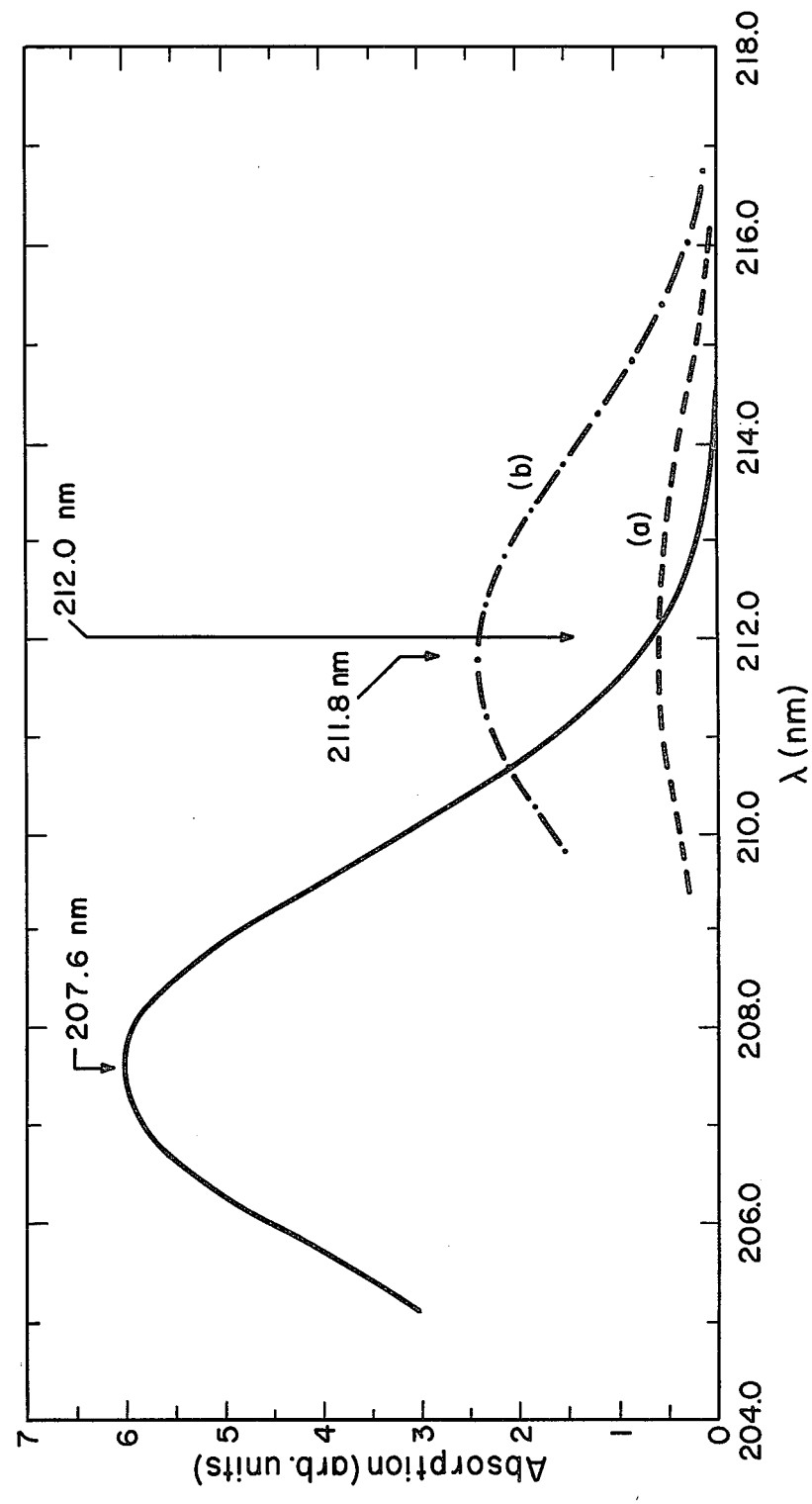
FIG. 3 shows calculated ultraviolet absorption spectra of ground state and excited $BCl_3$.

The ultraviolet absorption spectra of natural abundance $BCl_3$ at pressures of 4 and 2.1 torr are given in FIG. 2. The absorption is centered at 207.6 nm and free of any visible structure. It has a peak attenuation coefficient of $\alpha = 0.014$ cm$^{-1}$ torr$^{-1}$. FIG. 3 displays the 207.6 nm ultraviolet absorption fitted by a 5.0 nm FWHM Gaussian. This absorption leads to dissociation of the $BCl_3$. These conditions are appropriate to a $BCl_3$ pressure of about 2 torr. Curve (a) depicts the relative magnitude and location of absorption by 50% of the naturally available $^{10}BCl_3$ molecules which have been promoted to the $\nu_3$ mode by an infrared pulse of appropriate wavelength, while curve (b) displays the same information for excited $^{11}BCl_3$. Since the strongest lines of the $CO_2$ laser are absorbed by $^{11}BCl_3$, it is preferable to preferentially dissociate the $^{11}BCl_3$ and scavenge the dissociation products, leaving the gas enriched in $^{10}BCl_3$. The $^{10}B$ can then be readily recovered by conventional reduction of $BCl_3$ with $H_2$. Alternatively, if desired, the $^{10}BCl_3$ can be preferentially dissociated in accordance with this method.

The ultraviolet wavelength necessary to dissociate excited $BCl_3$ is dependent on the wavelength of the infrared radiation used to produce the excitation. It is in the spectral region of 213 to 215 nm. There are presently no lasers available having outputs in this wavelength; however, an intense continuum source such as Xe or $D_2$ lamps can readily be used if first filtered by being passed through a quartz cell containing $BCl_3$. The quartz passes little radiation below ~ 190.0 nm and the $BCl_3$, being unexcited and in the ground state, strongly attenuates the radiation centered around 207.6 nm indicated by the solid curve of FIG. 3. As a consequence, radiation filtered by this cell can only dissociate excited $BCl_3$. Although the filtering action will result in dissociation of $BCl_3$ in the filter cell, recombination will rather quickly occur, so that the filter cell will exhibit little if any aging.

A critical feature of the method of this invention is the presence of an appropriate chemical scavenger to react with the dissociation products of the selectively excited $BCl_3$. An appropriate scavenger should be gaseous, absorb little or none of the ultraviolet or infrared radiation, and react readily with the dissociation products of $BCl_3$, but not the $BCl_3$ itself. Suitable scavengers include $O_2$ and various alkenes.

Using the apparatus shown in FIGS. 4 and 5, the method of the invention was actually reduced to practice in the following manner. Reaction vessel 1 3 mm in diameter and having Brewster angle windows 2, 2' contained mixtures of 1 to 6 torr $BCl_3$ and 20 to 25 torr $O_2$. Surrounding reaction vessel 1 is filter vessel 3 25 cm long and 24 mm in diameter which contained $BCl_3$ at 600 torr. Reaction vessel 1 and filter vessel 3 were placed at one focus of elliptical flashlamp cavity 4, while a Xe flashlamp 5 was placed at the other focus. Flashlamp 5 discharged 750 joules of electrical energy in 250 μs. The ultraviolet filter 8 provided a 12 to 1 contrast ratio between 207.6 nm and 215.0 nm. Infrared radiation 6 at $4 \times 10^4$ W/cm$^2$ was provided from a $CO_2$ laser (not shown) operating on the P(20) line.

The infrared radiation 6 was propagated axially through reaction vessel 1 containing a desired ($BCl_3$,$O_2$) mixture at the peak of the ultraviolet pulse. Five pulses of combined ultraviolet and infrared radiation dissociated about half of the initial amount of $BCl_3$ present in reaction vessel 1. Infrared radiation 6 alone would not dissociate any $BCl_3$, whereas the filtered ultraviolet radiation required about 15 pulses to induce the same reaction as a single combined ultraviolet and infrared pulse. The product of the reaction between the scavenger $O_2$ and the dissociation products is thought to be $(BOCl)_3$.

Figure 6:
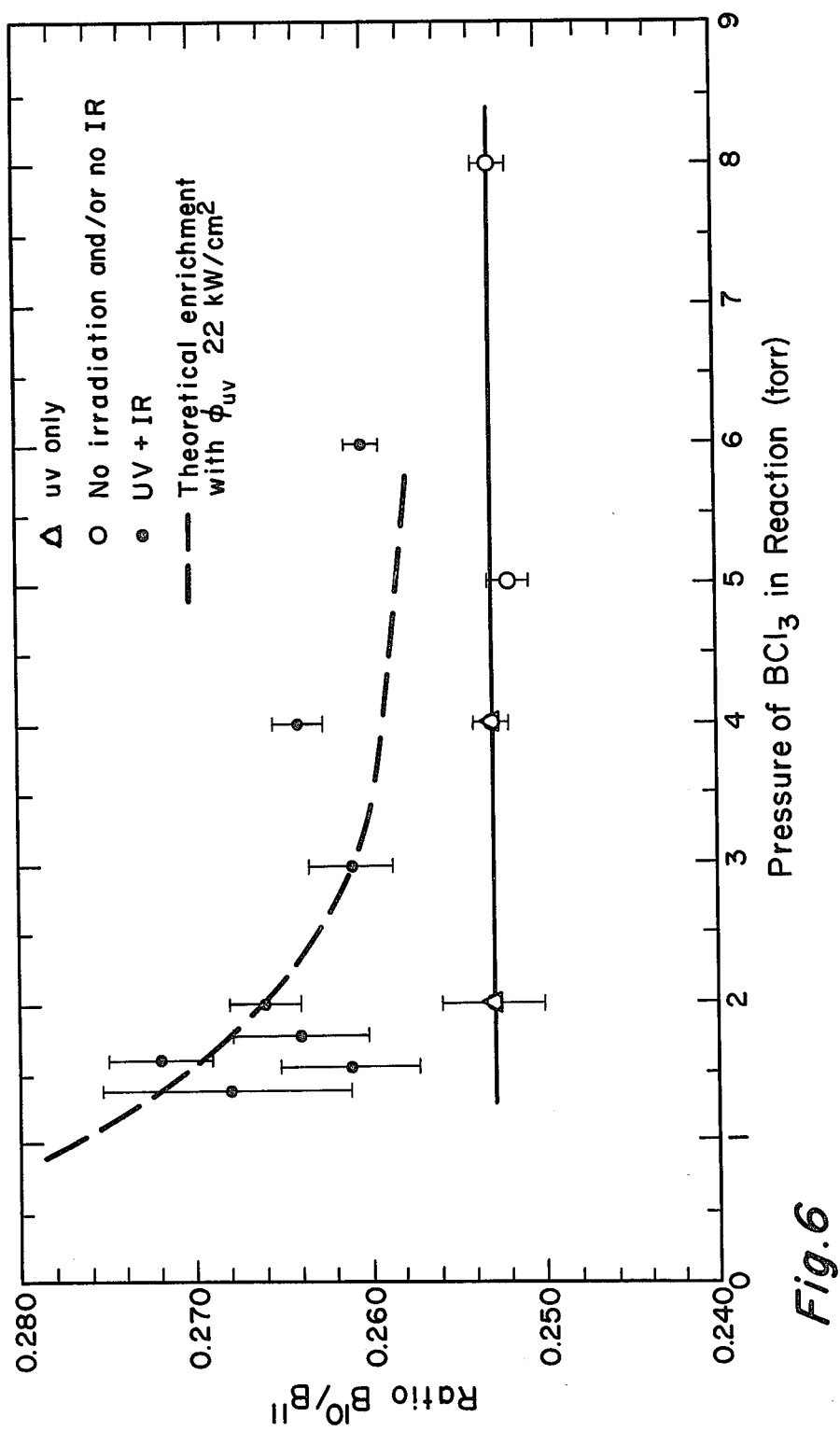
FIG. 6 is a plot of measured enrichment versus pressure of $BCl_3$.

The results of mass spectrometer analysis of the residual $BCl_3$ in irradiated mixtures of 1 to 6 torr of $BCl_3$ in 20 to 25 torr $O_2$ are shown in FIG. 6. The enrichment factors indicated in FIG. 6 can be increased by increasing the power level of the ultraviolet source.

What I claim is:

1. A method of separating isotopes of boron which comprises
   (a) obtaining a gaseous mixture of $BCl_3$ containing both boron isotopes and a scavenger, said scavenger being substantially nonreactive with $BCl_3$ but highly reactive with photodissociation products of $BCl_3$,
   (b) irradiating said mixture with radiation from the P or R branch lines of a $CO_2$ laser to preferentially excite those $BCl_3$ molecules containing a particular boron isotope,
   (c) simultaneously irradiating said mixture with ultraviolet radiation at a wavelength which will photodissociate those $BCl_3$ molecules excited by said $CO_2$ laser radiation but not those $BCl_3$ molecules not excited by said $CO_2$ laser radiation, and
   (d) separating undissociated $BCl_3$ from the reaction products of said photodissociation and said scavenger.

2. The method of claim 1 wherein said ultraviolet radiation has a wavelength in the range of 213 to 215 nm.

3. The method of claim 2 wherein said ultraviolet radiation is filtered by passage through unexcited $BCl_3$ before irradiating said mixture.

4. The method of claim 1 wherein said $BCl_3$ in said mixture is at a pressure of about 2 torr.

5. The method of claim 1 wherein said $CO_2$ laser radiation is from the P branch of said $CO_2$ laser.

6. The method of claim 5 wherein said $CO_2$ laser radiation is from the P(20) branch of said $CO_2$ laser.

7. The method of claim 1 wherein said scavenger is $O_2$.

8. A method of separating isotopes of boron which comprises
   (a) obtaining a gaseous mixture of $BCl_3$ containing both boron isotopes and $O_2$, said mixture comprising 1 to 6 torr of $BCl_3$ and 20 to 25 torr of $O_2$,
   (b) irradiating said mixture with 10.6 μm radiation from the P branch of a $CO_2$ laser to preferentially excite those molecules of $BCl_3$ containing $^{11}B$,
   (c) simultaneously irradiating said mixture with ultraviolet radiation at a wavelength between 213 and 215 nm to photodissociate excited molecules of $BCl_3$, and
   (d) separating undissociated $BCl_3$ from the reaction products of said photodissociation and said $O_2$.

9. The method of claim 8 wherein said ultraviolet radiation is filtered through unexcited $BCl_3$ before irradiating said mixture.

* * * * *